(12) United States Patent
Keahey et al.

(10) Patent No.: US 11,068,647 B2
(45) Date of Patent: Jul. 20, 2021

(54) MEASURING TRANSITIONS BETWEEN VISUALIZATIONS

(71) Applicant: International Business Machines Corporation, Armonk, NY (US)

(72) Inventors: Thomas A. Keahey, Naperville, IL (US); Daniel J. Rope, Reston, VA (US); Graham J. Wills, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 14/724,396

(22) Filed: May 28, 2015

(65) Prior Publication Data
US 2016/0350275 A1   Dec. 1, 2016

(51) Int. Cl.
*G06F 17/00* (2019.01)
*G06F 40/18* (2020.01)
*G06F 16/44* (2019.01)
*G06F 16/28* (2019.01)
*G06T 11/20* (2006.01)

(52) U.S. Cl.
CPC ............ *G06F 40/18* (2020.01); *G06F 16/287* (2019.01); *G06F 16/44* (2019.01); *G06T 11/206* (2013.01)

(58) Field of Classification Search
CPC .................................................... G06F 17/246
See application file for complete search history.

(56) References Cited

U.S. PATENT DOCUMENTS

| | | |
|---|---|---|
| 7,072,899 B2 | 7/2006 | Lokken |
| 7,089,261 B2 | 8/2006 | Hladik, Jr. |
| 7,366,719 B2 | 4/2008 | Shaw |
| 7,426,520 B2 | 9/2008 | Gorelik et al. |
| 7,463,263 B2 | 12/2008 | Gilboa |
| 7,584,415 B2 | 9/2009 | Cory et al. |

(Continued)

FOREIGN PATENT DOCUMENTS

| | | |
|---|---|---|
| WO | 2009154484 A2 | 12/2009 |
| WO | 2014210521 A1 | 12/2014 |

OTHER PUBLICATIONS

Chu et al., "Automatic Time Series Exploration for Business Intelligence Analytics," Application and Drawings, Filed on May 18, 2015, p. 1-53, U.S. Appl. No. 14/715,378.

(Continued)

*Primary Examiner* — Maikhanh Nguyen
(74) *Attorney, Agent, or Firm* — Patterson + Sheridan, LLP

(57) ABSTRACT

System, method, and computer program product for measuring transitions between visualizations, the method comprising identifying data fields represented in a first visualization and one or more presentation characteristics for the data fields represented in the first visualization, identifying data fields represented in a second visualization and one or more presentation characteristics for the data fields represented in the second visualization, determining a plurality of transition scores, wherein each transition score represents a difference or similarity between the first and second visualizations, relative to either the identified data fields or the presentation characteristics, and generating a composite measure of transition between the first and second visualizations from the plurality of transition scores.

14 Claims, 8 Drawing Sheets

(56) References Cited

U.S. PATENT DOCUMENTS

| | | | |
|---|---|---|---|
| 7,603,326 | B2 | 10/2009 | Bonabeau et al. |
| 8,117,139 | B2 | 2/2012 | Bonabeau et al. |
| 8,132,122 | B2 | 3/2012 | Risch et al. |
| 8,301,585 | B2 | 10/2012 | Mourey et al. |
| 8,352,400 | B2 | 1/2013 | Hoffberg et al. |
| 8,531,451 | B2 | 9/2013 | Mital et al. |
| 8,838,510 | B2 | 9/2014 | Baughman et al. |
| 2003/0130996 | A1 | 7/2003 | Bayerl et al. |
| 2005/0102325 | A1* | 5/2005 | Gould ............... G06F 17/30466 |
| 2009/0096812 | A1 | 4/2009 | Boixel et al. |
| 2009/0105984 | A1 | 4/2009 | Wen et al. |
| 2010/0194778 | A1 | 8/2010 | Robertson et al. |
| 2012/0313949 | A1 | 12/2012 | Rope et al. |
| 2013/0103677 | A1 | 4/2013 | Chakra et al. |
| 2013/0132042 | A1 | 5/2013 | Chan |
| 2013/0166337 | A1 | 6/2013 | MacGregor |
| 2014/0114629 | A1 | 4/2014 | Jojgov et al. |
| 2014/0247268 | A1* | 9/2014 | Drucker ................. G06T 13/80 345/440.2 |
| 2014/0354650 | A1* | 12/2014 | Singh ...................... G06F 8/34 345/440 |
| 2014/0358999 | A1* | 12/2014 | Rabinowitz ............ H04L 67/10 709/203 |
| 2015/0002518 | A1* | 1/2015 | Nakajima ............... G06T 13/40 345/474 |
| 2015/0007074 | A1 | 1/2015 | Mackinlay et al. |
| 2015/0161805 | A1* | 6/2015 | Glazer ................. G06T 11/206 345/441 |
| 2015/0278371 | A1* | 10/2015 | Anand .................. G06F 16/338 707/723 |
| 2016/0104311 | A1* | 4/2016 | Allyn .................. G06F 17/3012 345/473 |
| 2016/0124960 | A1* | 5/2016 | Moser .................. G06T 11/206 707/723 |

OTHER PUBLICATIONS

Farooq et al., "An Interactive Visualization of Genetic Algorithm on 2-D Graph," Proceedings of the 10th IEEE International Conference on Cognitive Informatics and Cognitive Computing (ICCI*CC'11), Aug. 18-20, 2011, p. 144-151, IEEE, Banff, Alberta, Canada.

Forbus, "Using Evolutionary Algorithms to Generate Multi-View Visualization Layouts," University of Oklahoma Graduate College Thesis, 2012, p. 1-82, Norman, Oklahoma.

Hart et al., "GAVEL—A New Tool for Genetic Algorithm Visualization," IEEE Transactions on Evolutionary Computation, Aug. 2001, p. 335-348, vol. 5, No. 4, IEEE.

Keahey et al., "Determining User Preferences for Data Visualizations," Application and Drawings, Filed on Jun. 29, 2015, p. 1-38, U.S. Appl. No. 14/753,196.

Kinch, "Computer-Aided Design of Computer Architectures Using Interactive Graphic Representation," University of Illinois at Urbana-Champaign Master's Thesis, Dec. 1978, 135 Pages, Report No. UIUCDCS-R-78-952, IP.com No. 000151435, Software Patent Institute.

Li, "Direct Manipulation of Integrated Documents: An Approach to Interactively Manipulate Spatial Relationships Based on Constraint Programming Techniques," Royal Institute of Technology Technical Report, 1989, p. 1-81, IP.com No. 000150287, Software Patent Institute, Stockholm, Sweden.

Mell et al., "The NIST Definition of Cloud Computing," National Institute of Standards and Technology, Sep. 2011, p. 1-3, Special Publication 800-145.

Agrawal, R. et al., "Querying Shapes of Histories", in Proc. of the 21st Very Large Data Bases Conf., 1995, 13 pgs.

Lu et al.; "Data Visualization of Web Services With Parallel Coordinates and NodeTrix", Services Computing (SCC), 2014 IEEE International Conference on, Jun. 27-Jul. 2, 2014, pp. 766-773.

Rusu et al.; "Document Visualization Based on Semantic Graphs", Information Visualization, 2009 IEEE 13th International Conference on, Jul. 15-17, 2009, pp. 292-297.

Collins et al.; VisLink: Revealing Relationships Amongst Visualizations, Visualization and Computer Graphics, IEEE Transactions on, vol. 13, No. 6, Nov./Dec. 2007, pp. 1192-1199.

* cited by examiner

MEASURING TRANSITIONS BETWEEN VISUALIZATIONS

BACKGROUND

Embodiments disclosed herein relate to computer software. More specifically, embodiments disclosed herein relate to computer software which identifies and measures the transitions between visualizations.

Data visualization, such as a chart view of data in a spreadsheet, is often important to gain a better understanding of complex datasets. As such, data visualization is widespread across a range of users and industries. This ability to better understand data may encourage larger and more complex data sets. As datasets become more complex, data visualizations have also become more complex as well. Increasingly, data visualization has moved beyond single visualizations in isolation, to encompass a sequence or collection of related visualizations. The relationships between these related visualizations then become an important aspect in conveying insights into the data. Accordingly, techniques for measuring transitions between visualizations are needed.

SUMMARY

Embodiments disclosed herein provide a system, method, and computer program product for measuring transitions between visualizations, the method comprising identifying data fields represented in a first visualization and one or more presentation characteristics for the data fields represented in the first visualization, identifying data fields represented in a second visualization and one or more presentation characteristics for the data fields represented in the second visualization, determining a plurality of transition scores, wherein each transition score represents a difference or similarity between the first and second visualizations, relative to either the identified data fields or the presentation characteristics, and generating a composite measure of transition between the first and second visualizations from the plurality of transition scores.

BRIEF DESCRIPTION OF THE SEVERAL VIEWS OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
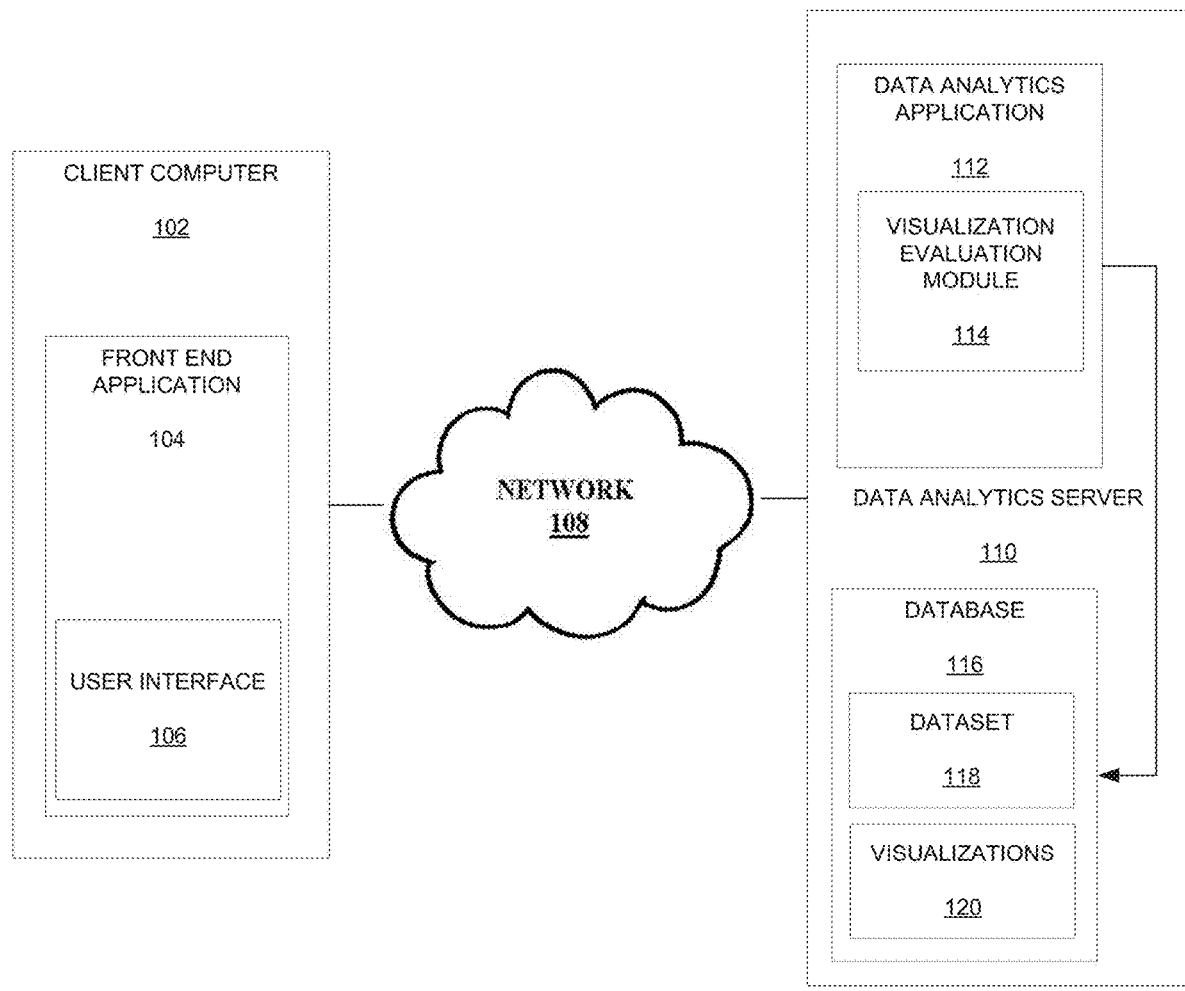
FIG. 1 is a block diagram illustrating a networked system for use in measuring transitions between visualizations according to one embodiment.

Embodiments disclosed provide techniques for measuring transitions between visualizations.

As data sets become increasingly larger and more complex, they become more difficult to analyze and understand. Increasingly, a set or collection of visualizations may be used to offer insight into the data set, where each visualization offers a particular view of the data. Within such sets, the relationship between the visualizations becomes important. For example, the sequence in which the visualizations are presented may help a user gain a deeper insight into the data. While in the past, there has been a great deal of work done to measure the effectiveness of individual data visualizations in isolation, less has been done to measure the properties of the relationships between multiple visualizations.

Data visualizations, such as a chart, can be thought of as combinations of the mapping of data fields of a data set and visualization channels or properties. The mapping of data fields and visualization channels may be different between visualizations and this mapping between the data field and channel combinations via connectors define a transition. A transition between visualizations is connected if there are shared data fields or visualization channels across the transition.

Within a set of data visualizations, the relationships between individual visualizations may determine how the individual visualizations go together. That is, the properties that define the characteristics of the individual visualizations determine how well the individual visualizations go together to deliver insight on the data. Individual visualizations should have enough in common so that a user can connect the dots between the visualizations, but there should be enough difference between the visualizations so that insights offered are unique and worthwhile. For example, a linked transition between a bar and pie charts may help direct attention from the relative sizes of individual groups to how the individual groups compare against the whole set of the groups.

A system for measuring the transition between visualizations may take into account these similarities and differences in order to provide a general purpose visualization transition scoring for a wide variety of data and tasks. Quantification of transitions may be accomplished using a vector or n-tuple of numeric values organized into a transition signature $S_T = \{T_1, T_2, \ldots, T_n\}$. The components of tuples may be based on changes in the data mapped to the visualization channels (e.g., axes, colors, shapes, etc.) as well as changes to the actual visual channels used to represent the data (e.g., chart type, sorting, etc.). Examples of possible tuple components include, but are not limited to: (1) the number of channels and data in the source and destination visualization that are unchanged; (2) changing the data field in a shared source/destination visual channel; (3) modified channel from source to destination (e.g., binning/de-binning, filter, sorting, aggregation/disaggregation), where the actual data field(s) stay the same; (4) added channels in destination visualization (adding data); (5) fewer channels in destination visualization (removing, simplifying, focusing data); and (6) moving data fields from one visual channel to another (no new information, just changing presentations).

Additional tuple components may be defined based on non-intrinsic visualization properties, such as analysis of metadata to determine relationships between data fields, similarities between user generated natural language queries, hypothesis or goal proximity analysis that determine whether various transitions enable visualizations closer to the stated goals of a session, the set of available visualizations, the level of viewer sophistication, properties of the data, and availability of metadata or available algorithms to direct the transition analysis. Tuple components may be defined by comparisons of the properties of the visualizations where the comparison results are converted into numeric values. For example, where a single data field is added, the value of the tuple representing changes in the data fields may be equal to 1. Alternatively, numeric values may be defined for various n-tuples and used to generate visualizations to facilitate analytical tasks, such as meta-data analysis and goal-oriented tasks, or to build models or other suitable sets of visualizations, such as for semi-automated guided analysis of complex data sets by underlying statistical and cognitive computing algorithms.

While there may be any number of tuples, tuples broadly fall into a limited number of higher level categories. This aggregation of lower order tuple components into a higher-order tuple creates a smaller tuple that reflects the essential transition characteristics of interest which can be used to construct meaningful sequences and collections of related visualizations. An example of higher order tuple may include a transition triplet $C_t = \{T_c, T_d, T_s\}$ where $T_c$ represents the degree of continuity between the visualizations, $T_d$ represents the degree of major discontinuity, and $T_s$ represents the degree of minor discontinuity.

FIG. 1 is a block diagram illustrating a networked system for use in measuring transitions between visualizations according to one embodiment. As shown, a front end application 104 may execute on a client computer 102. Client computer 102 may be a personal computer, terminal device, hand-held device, or other computing device. The front end application 104 may contain a user interface 106 and communicate via a network 108, such as a local area network or the internet, to a data analytics server 110. The front end application 104 may be a stand-alone application or running in the context of a browser and may interface with a data analytics server 110. The front end application 104 may communicate with the data analytics server 110 to perform data analysis operations as well as provide input to and output from the data analytics server 110. A portion of the data analysis may be performed by the front end application 104 based on data from the data analytics server 110 or data analysis may be performed by the data analytics server 110. The data analytics server 110 may execute a data analytics application 112 containing a visualization evaluation module 114. The visualization evaluation module 114 may request and receive information about visualizations from the database 116, perform analysis operations on the information to generate transition triplets, and output via an interface to the data analytics server 112.

The data analytics server 112 may perform additional analysis or formatting and then transmit the information to the front end application 104 via the network 108 for display by the user interface 106. The network 108 may be any form of computer network, such as a bus, local area network (LAN), wide area network (WAN), wireless connection, or the internet. Requests for information by the visualization evaluation module 114 may be made via an interface to the data analytics application 112. The data analytics application 112 may communicate with a database 116 containing the dataset 118 and visualizations 120. The database 116 may store the dataset 118 along with the visualizations 120 in a single storage device, or across multiple storage devices and/or locations. The visualizations 120 may make up a portion of the dataset 118. Portions of the database 116 may also reside on the client computer 102 and may contain replicas, caches, and/or updated/changed data. The database 116 may reside in the same or a separate server from the data analytics server 110. Although shown as separate components, the data analytics server 110 may execute in the same computer as the front end application 104 and communicate programmatically via an interface and or bus. The data analytics server 110 may also be linked to or contain components for generating visualizations.

Visualizations may be generated, for example, by a user and organized into sets for evaluation by the visualization evaluation module. Alternatively or additionally, visualizations may be machine generated. A set of visualizations may be machine generated, for example using genetic or deep query analysis mechanisms, based on data sources accessed or associated with a particular visualization. This set of visualizations may then be passed to the visualization evaluation module for evaluation.

Figure 2:
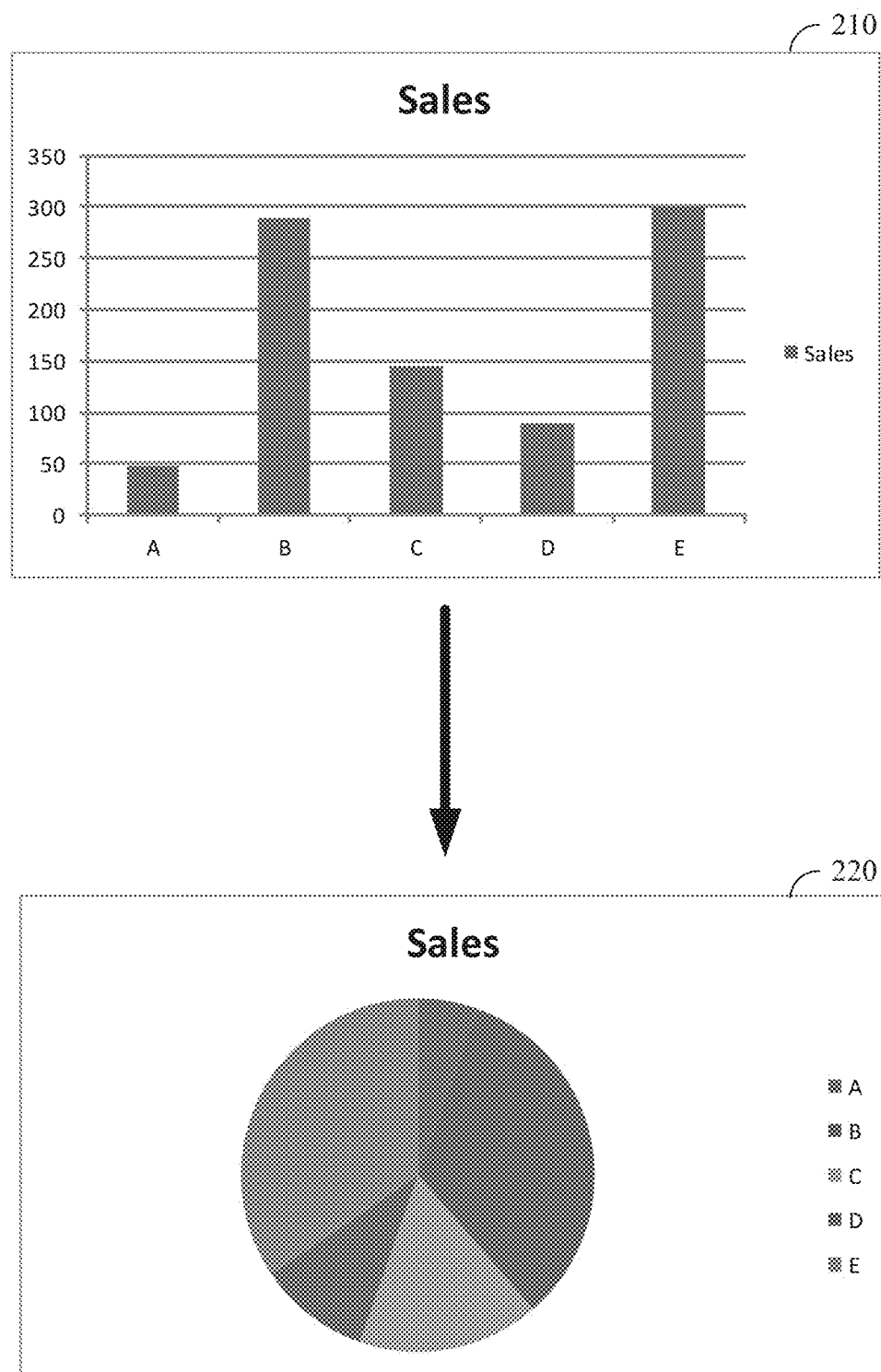
FIG. 2 illustrates a transition between visualizations according to one embodiment.

FIG. 2 illustrates a transition between visualizations according to one embodiment. Bar chart 210 illustrates a first visualization of data. The bar chart format generally enables easier relative comparisons between groups or tracking changes over time. Pie chart 220 illustrates a second visualization of data that generally allows easier comparison of groups to a whole. The transition between the bar chart 210 visualization and the pie chart 220 visualization is connected as the data set remains the same, while only the formatting of the visualization has changed. The degree of continuity between the visualizations, $T_c$, measures the total number of data fields that stay the same. Here, a single data field remains the same for this transition, and so $T_c=1$. If the visualizations did not share any data fields, then the degree of continuity would have been 0, indicating that there is no continuity for the transition. The degree of major discontinuity, $T_d$, looks at the absolute difference in the number of channels as well as changed channels or data fields. In this example, visualization channels, such as data on the axes, also remain the same for both visualizations and there are no other data field changes, so there is no discontinuity and $T_d=0$. The degree of minor or syntactic discontinuity, $T_s$, between the visualizations, looks at the switches or visualization properties for other various ways the visualization style may differ, such as color, filters, chart style mapping, etc. In this example, the chart style mapping is changes from a linear bar style to a radial pie chart, so $T_s=1$. Overall the transition tuple describing the higher order transition properties for this transition would be $C_t=\{1, 0, 1\}$, indicating that the transition is more continuous than discontinuous, with only a small number of syntactic changes.

Figure 3:
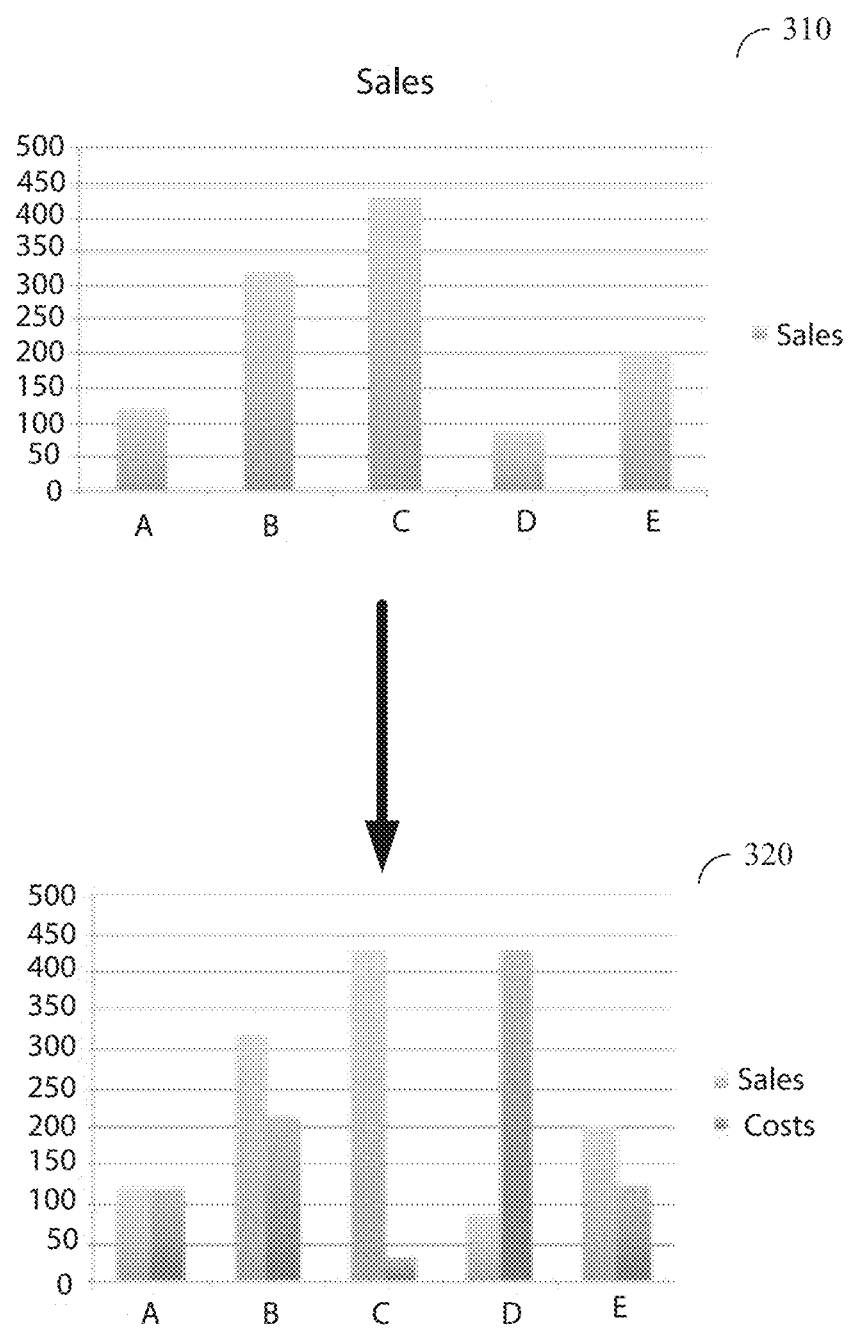
FIG. 3 illustrates a transition between visualizations according to one embodiment.

FIG. 3 illustrates a transition between visualizations according to one embodiment. Bar chart 310 illustrates a first visualization of data. Cluster bar chart 320 illustrates a second visualization of the data. In this case, a single data field, Sales, is common to both visualizations, so $T_c=1$. However, a new data field, Costs, has been added in the cluster bar chart 320 and $T_d=1$, reflecting the new data field. In addition, the Costs data field appears as a different color than the Sales data field. This additional color influences the syntactic discontinuity and $T_s=1$. The overall transition tuple for this transition between bar chart 310 and cluster bar chart 320 would be $C_t=\{1, 1, 1\}$, indicating that while there are structural differences, there is still a degree continuity, along with small syntactic changes between the first and second visualizations.

Figure 4:
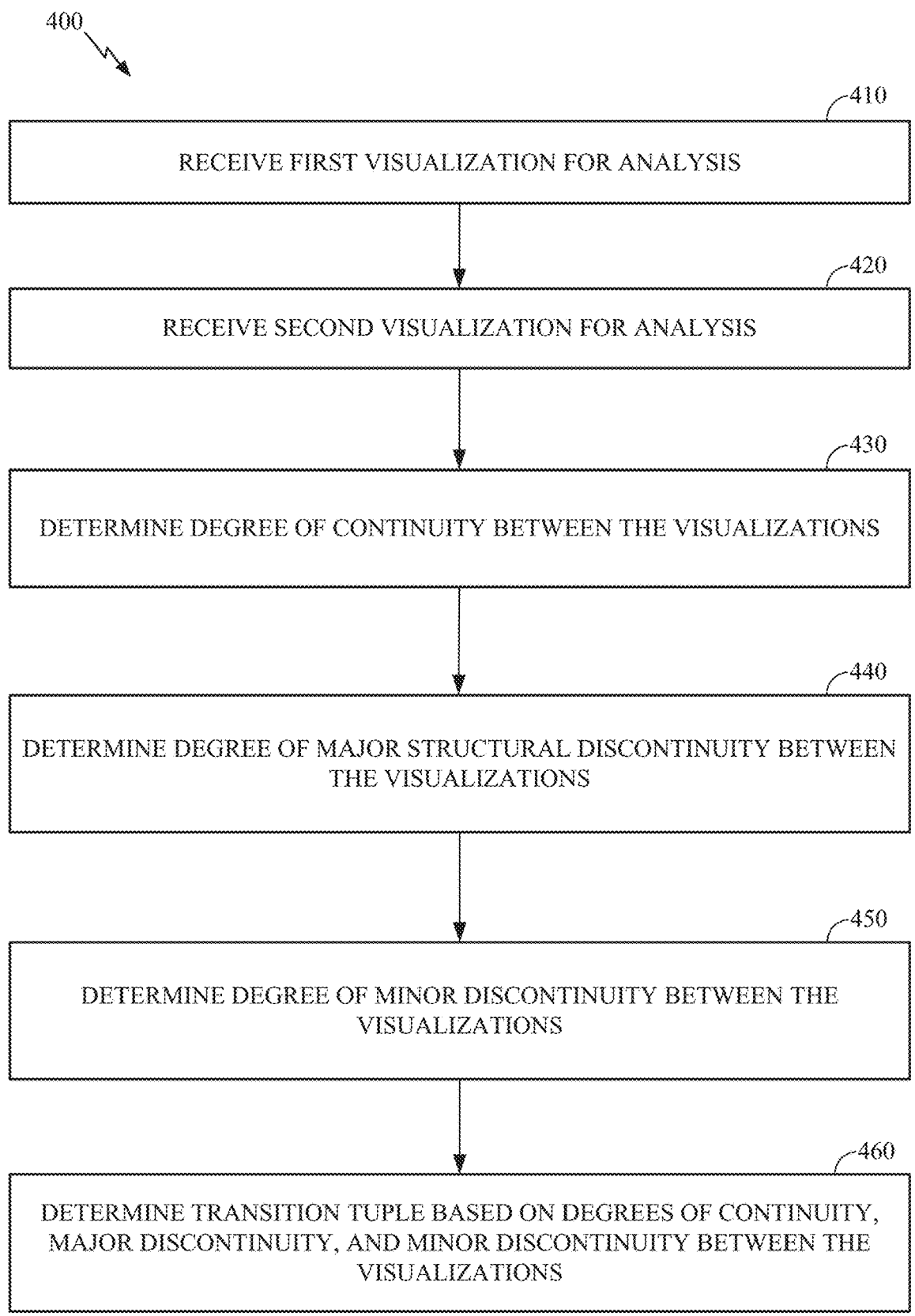
FIG. 4 is a flow chart illustrating a method for measuring transitions between visualizations according to one embodiment.

FIG. 4 is a flow chart illustrating a method 400 for measuring transitions between visualizations, according to one embodiment. At step 410, the visualization evaluation module receives a first visualization for analysis. For example, the visualization evaluation module may be initialized by a data analytics application, which may pass the first visualization to the visualization evaluation module. Alternatively, a user may initiate a process by which either the data analytics application or visualization evaluation module requests the first visualization from the database, which returns the visualization data. At step 420, the visualization evaluation module receives a second visualization for analysis. The visualization evaluation module may receive the second visualization in a similar manner to receiving the first visualization. The visualization evaluation module may also receive, from the data analytics application or some other module or component a second visualization from a set of visualizations to be evaluated against the first visualization. For example, the data analytics application may retrieve, or generate, a set of visualizations for evaluation. This set of visualizations may have been previously user generated along with the first visualization or otherwise associated with the first visualization. Further, a user may indicate, a set of visualizations which may be evaluated against the first visualization. Alternatively or additionally, a set of visualizations may be machine generated, for example using genetic or deep query analysis mechanisms and then passed to the visualization evaluation module for evaluation. Individual visualizations from the set of visualizations may then be passed to the visualization evaluation module.

At step 430, the visualization evaluation module determines a degree of continuity between the visualizations. The visualization evaluation module may look to see if there are any data fields and visual channels common to both visualizations by comparing the data fields represented in each visual channel in the visualizations to see whether particular data fields are referenced in both visualizations. Step 430 is discussed in greater detail with reference to FIG. 5. At step 440, the visualization evaluation module determines a degree of major discontinuity. The visualization evaluation module may look to see if the number of visual channels between the two visualizations have changed, or compare the number of channels in the first visualization against the second visualization. Step 440 is discussed in greater detail with reference to FIG. 6. At step 450, the visualization evaluation module determines a degree of minor or syntactic discontinuity. The visualization evaluation module may compare the visualization channel switches or settings, which may determine visualizations style, such as size, color, and shape, to determine if these switches or settings are common to both visualizations. Additionally, the visualization evaluation module may consider various other visualization properties, such as whether data aggregation/binning, filtering, or disaggregation, have been applied. Step 450 is discussed in greater detail with reference to FIG. 7. At step 460, a transition tuple is determined based on the degree of continuity, the degree of major discontinuity, and the degree of minor discontinuity. For example, the transition tuple may be assembled based on the number of data field and visualization channel combination used in both the first and second visualizations, the difference in the number of visualization channels between the first and second visualizations, and various switches and visualization properties applied to one of the visualization channels to yield a transition tuple, such as $\{1, 1, 1\}$.

Figure 5:
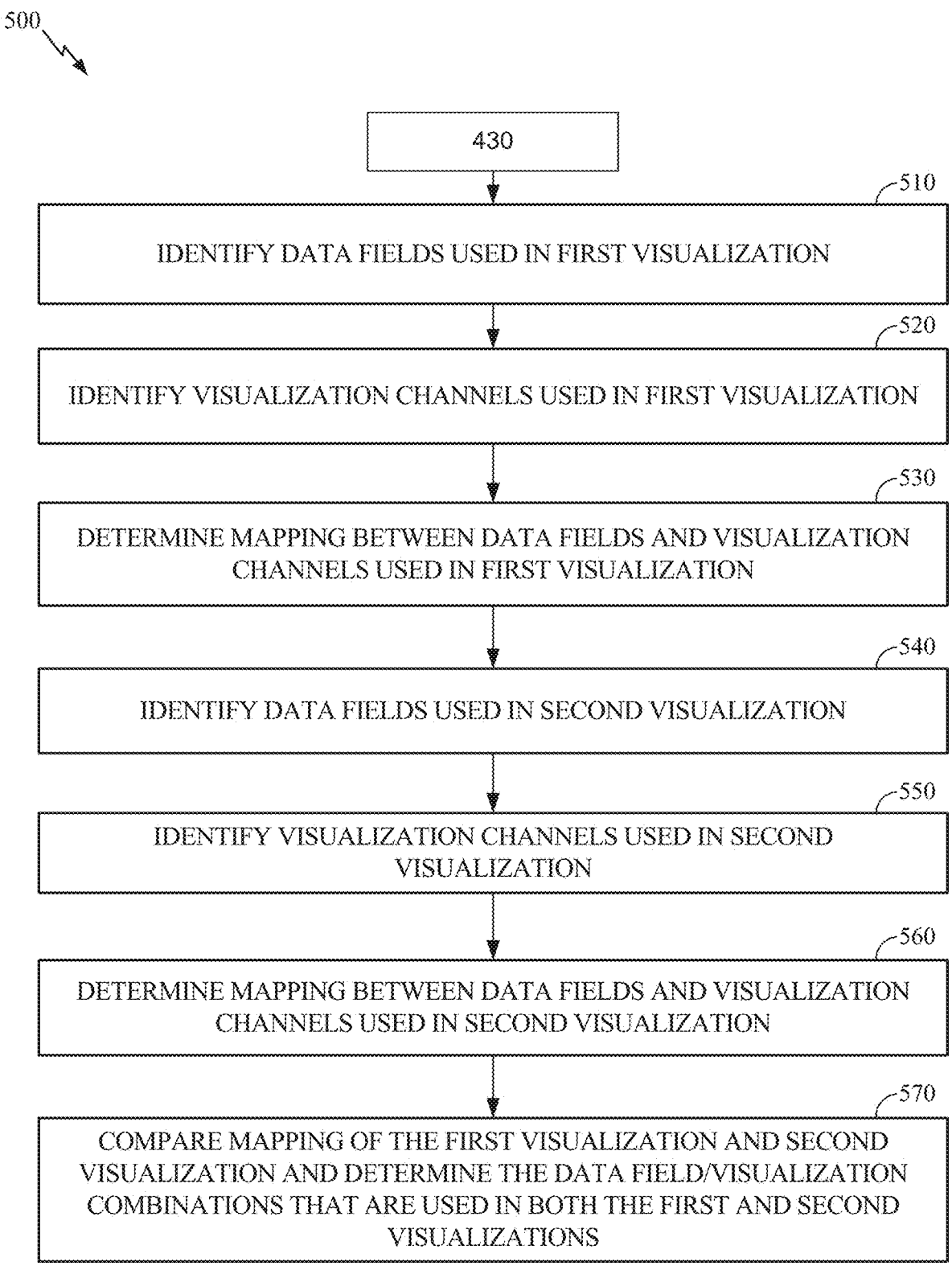
FIG. 5 is a flow chart illustrating a method for determining a degree of continuity between visualizations according to one embodiment.

FIG. 5 is a flow chart illustrating a method 500 for determining a degree of continuity between visualizations according to one embodiment. At step 510, the visualization evaluation module identifies data fields used in the first visualization. This may be done, for example, by examining the data fields referenced by the first visualization. At step 520, the visualization evaluation module identifies visualization channels used in the first visualization. To visualize a particular data field, that data field is associated with a particular visualization channel. For example, a number of sales may be associated with the y-axis of a bar chart. At step 530, a mapping between the data fields and visualization channels used in the first visualization are determined. This mapping may consist of the set of associations between a particular data field and a particular visualization channel. At step 540, the visualization evaluation module identifies data fields used in the second visualization. At step 550, the visualization evaluation module identifies visualization channels used in the second visualization. At step 560, a mapping between the data fields and visualization channels used in the second visualization is determined. Although shown as sequential steps, operations on the first and second visualizations may be performed as parallel operations. At step 570, the maps of the data fields and visualization channels for the first visualization and second visualization are compared and the visualization evaluation module determines if any data field and visualization channel combinations are used in both the first and second visualizations. The number of data field and visualization channel combinations common to both the first and second visualizations may be used as a part of the transition tuple.

Figure 6:
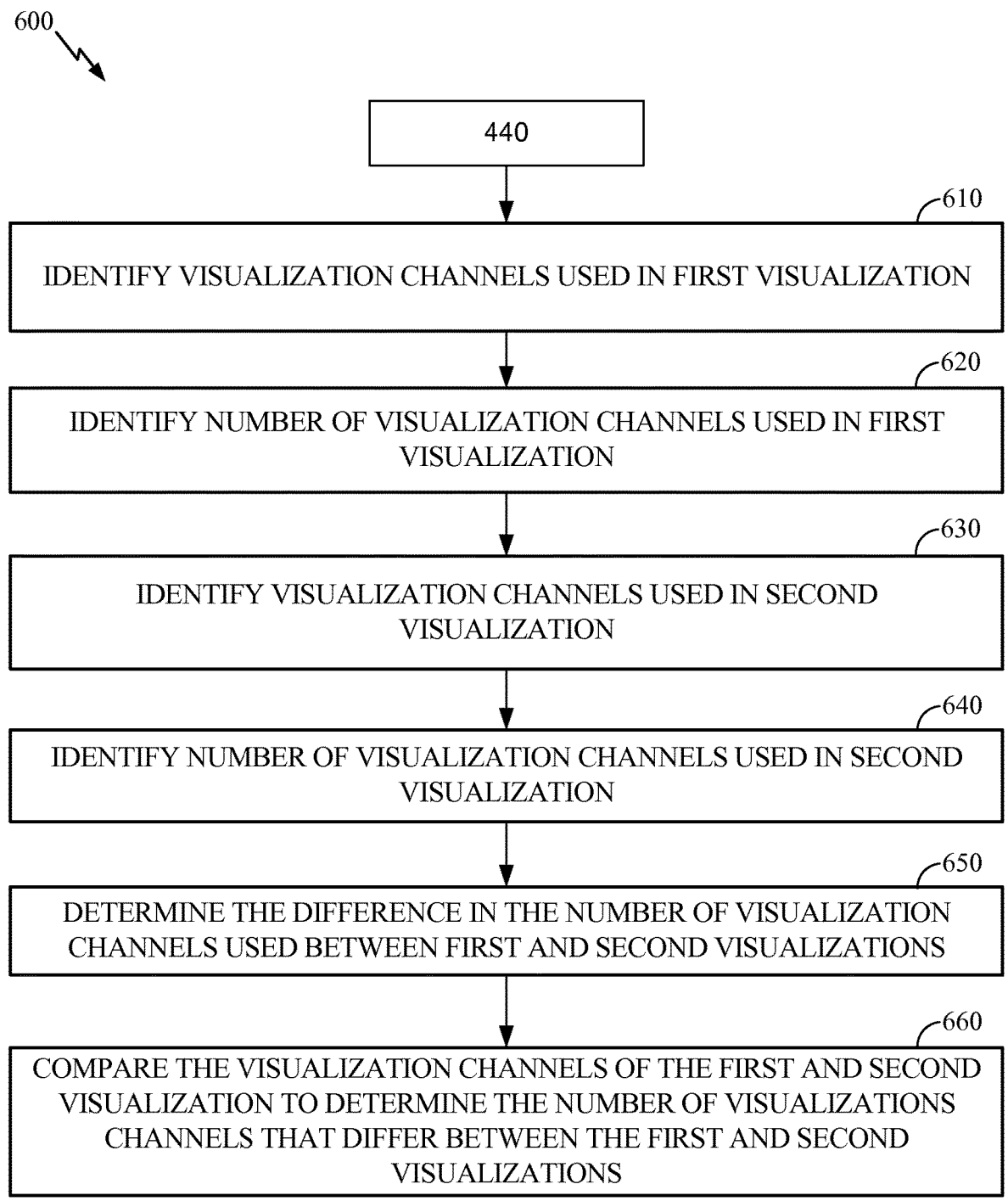
FIG. 6 is a flow chart illustrating a method for determining a degree of major structural discontinuity between visualizations according to one embodiment.

FIG. 6 is a flow chart illustrating a method 600 for determining a degree of major structural discontinuity between visualizations according to one embodiment. At step 610, the visualization evaluation module identifies visualization channels used in the first visualization. At step 620, the visualization evaluation module identifies the number of visualization channels used in the first visualization. This may be performed, for example, by looping though all the identified visualization channels of the first visualization and incrementing a counter. At step 630, the visualization evaluation module identifies visualization channels used in the second visualization. At step 640, the visualization evaluation module identifies the number of visualization channels used in the second visualization. Although shown as sequential steps, operations on the first and second visualizations may be performed as parallel operations. At step 650, a difference in the number of visualization channels used between the first and second visualizations are determined. However, while the number of channels may stay the same during a transition, the channels themselves may be different channels between the first and second visualizations. At step 660, the visualization channels of the first and second visualizations are compared to determine the number of visualization channels that differ between the first and second visualizations. The difference in the number of visualization channels and the number of visualization channels that are different between the first and second visualizations may be combined, for example, summed or averaged, to determine the major structural discontinuity indicator of the transition tuple.

Figure 7:
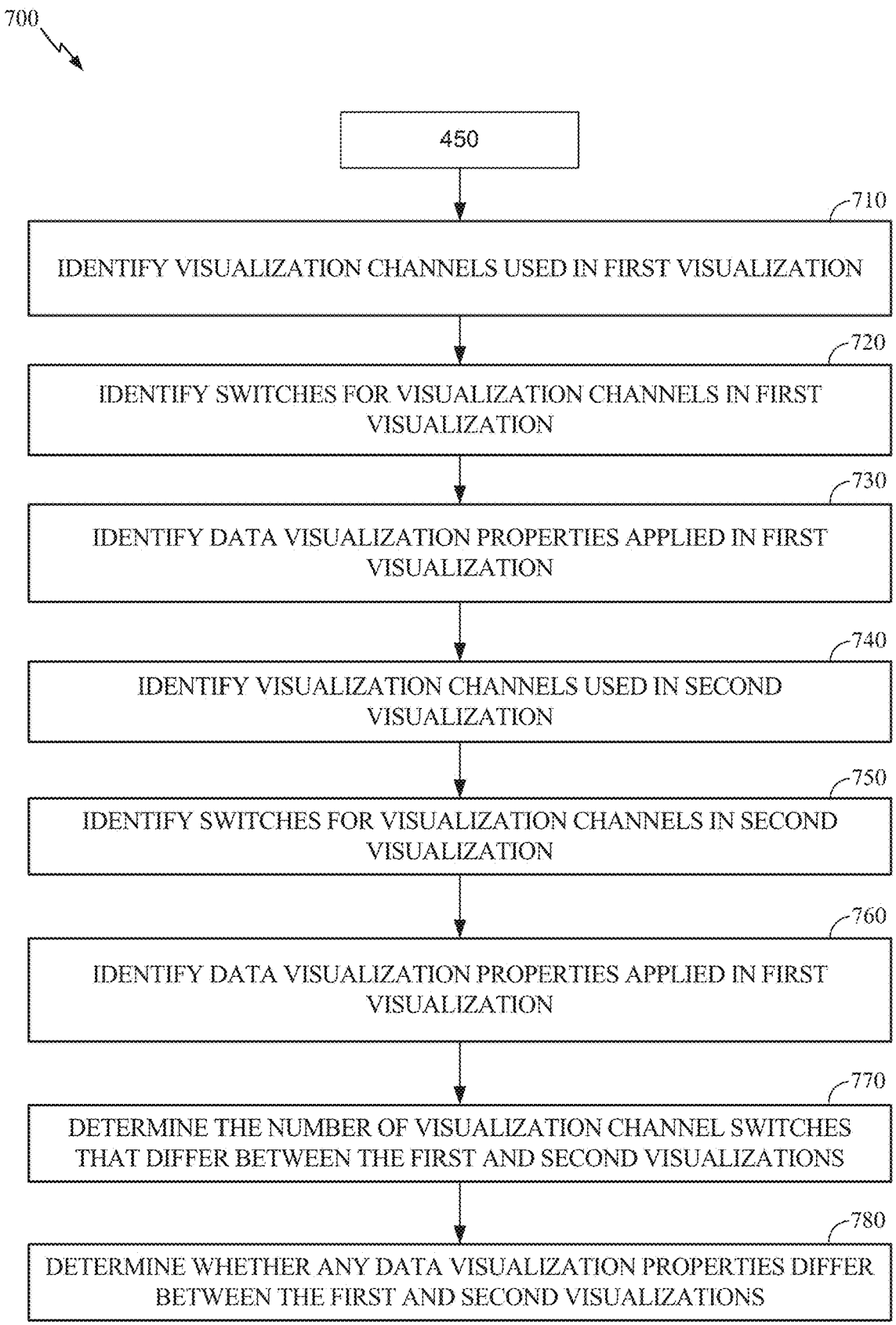
FIG. 7 is a flow chart illustrating a method for determining a degree of minor discontinuity between visualizations according to one embodiment.

FIG. 7 is a flow chart illustrating a method 700 for determining a degree of minor discontinuity between visualizations according to one embodiment. At step 710, the visualization evaluation module identifies visualization channels used in the first visualization. Visualization style, such as size, color, and type influencing how a particular visualization channel may look, may be adjusted based on switches applied to particular visualization channels. At step 720, the visualization evaluation module identifies the switches used for the visualization channels in the first visualization. Other visualization properties may also influence how data is presented, such as whether data has been aggregated or binned, filtered, or disaggregated. At step 730, the visualization evaluation module identifies the data visualization properties applied in the first visualization. At step 740, the visualization evaluation module identifies visualization channels used in the second visualization. At step 750, the visualization evaluation module identifies the switches used for the visualization channels in the second visualization. At step 760, the visualization evaluation module identifies the data visualization properties applied in the second visualization. Although shown as sequential steps, operations on the first and second visualizations may be performed as parallel operations. At step 770, the number of visualization channel switches that differ between the first and second visualizations are determined by the visualization evaluation module. The differences in visualization channel switches may take into account data transposes where, for example, the same colors are applied, but the visualization channels to which the colors are applied are switched. At step 780, the visualization evaluation module determines whether any data visualization properties differ between the first and second visualizations. The number of changed switched and data visualization properties between the first and second visualizations may be combined, for example, summed or averaged, to determine the minor, or syntactic discontinuity indicator of the transition tuple.

Figure 8:
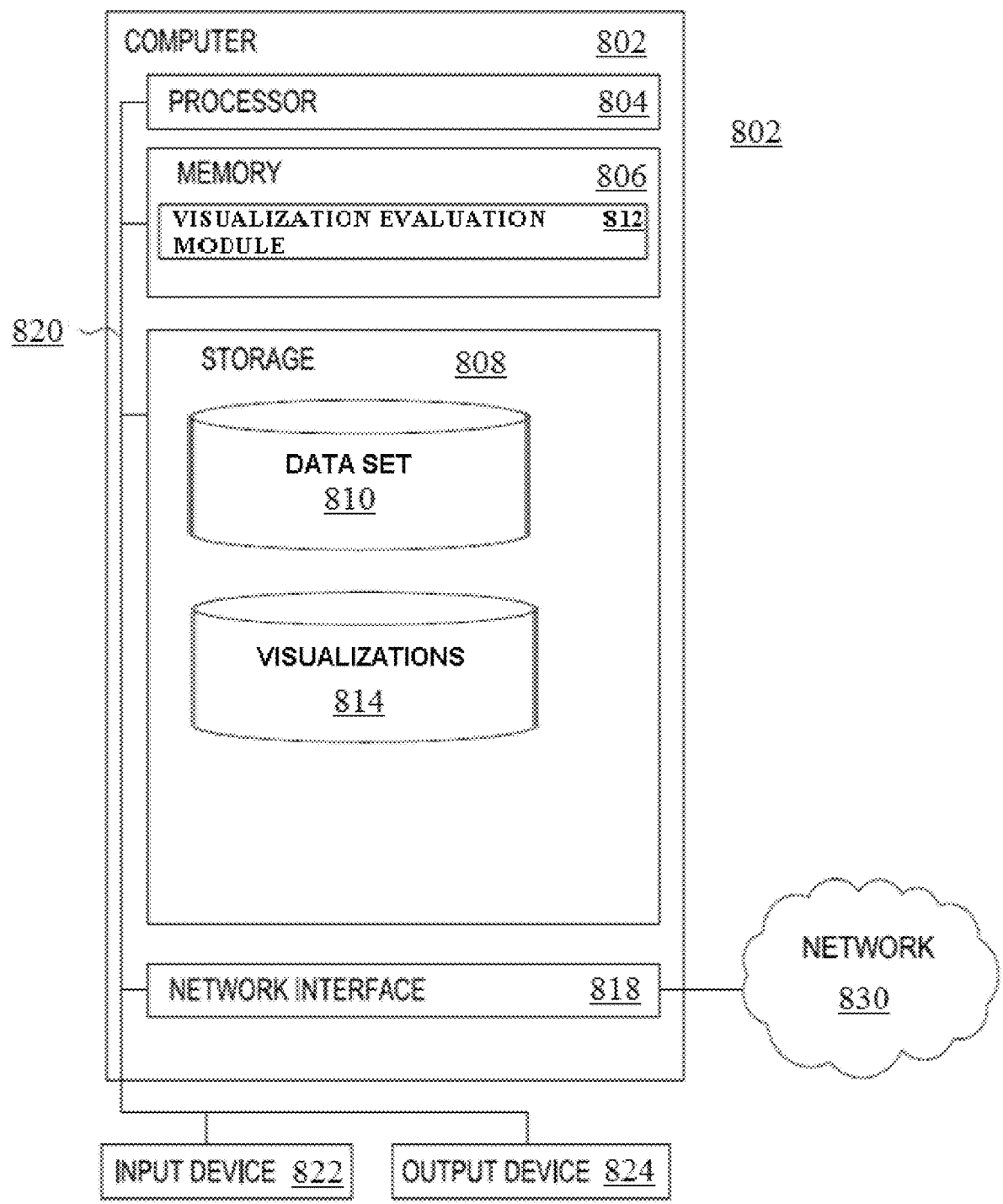
FIG. 8 is a block diagram illustrating components of a system for use in measuring transitions between visualizations according to one embodiment.

FIG. 8 is a block diagram illustrating a system 800 for measuring transitions between visualizations, according to one embodiment disclosed herein. The networked system 800 includes a computer 802. The computer 802 may also be connected to other computers via a network 830. In general, the network 830 may be a telecommunications network and/or a wide area network (WAN). In a particular embodiment, the network 830 is the Internet.

The computer 802 generally includes a processor 804 connected via a bus 120 to a memory 806, a network interface device 818, a storage 808, an input device 822, and an output device 824. The computer 802 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 804 is included to be representative of a single CPU, multiple CPUs, a single CPU having multiple processing cores, and the like. Similarly, the memory 806 may be a random access memory. While the memory 806 is shown as a single identity, it should be understood that the memory 806 may comprise a plurality of modules, and that the memory 806 may exist at multiple levels, from high speed registers and caches to lower speed but larger DRAM chips. The network interface device 818 may be any type of network communications device allowing the computer 802 to communicate with other computers via the network 830.

The storage 808 may be a persistent storage device. Although the storage 808 is shown as a single unit, the storage 808 may be a combination of fixed and/or removable storage devices, such as fixed disc drives, solid state drives, removable memory cards or optical storage. The memory 806 and the storage 808 may be part of one virtual address space spanning multiple primary and secondary storage devices.

As shown, the memory 806 contains the visualization evaluation module 812, which is generally configured to measure transitions between visualizations. The visualization evaluation module 812 may be executed on a client computer, on a remote server, or a combination thereof. The visualization evaluation module, although shown as a single unit, may be spread across multiple memory or storage devices and computers. The visualization evaluation module 812 may be executed as a part of general data analytics application.

As shown, storage 808 contains a data set 810, and visualizations 814. The data set 810 is a body of information used by the visualization evaluation module 812 used to generate visualizations. The data set 810 may be made of multiple data fields for organization. The visualizations 814 may include generated charts, along with data set and visualization channel mappings and other settings and properties. Although depicted as databases, data set 810, and visualizations 814 may take any form sufficient to store data, including text files, xml data files, and the like. In one embodiment, the visualizations 814 are part of the data set 810 as a part of a larger database. Although depicted as residing on the same computer, any combination of the visualization evaluation module 812, the data set 810, and visualizations 814 may reside on the same or different computers.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the preceding, reference is made to embodiments of the disclosure. However, it should be understood that the disclosure is not limited to specific described embodiments. Instead, any combination of the preceding features and elements, whether related to different embodiments or not, is contemplated to implement and practice the disclosure.

Furthermore, although embodiments of the disclosure may achieve advantages over other possible solutions and/or over the prior art, whether or not a particular advantage is achieved by a given embodiment is not limiting of the disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be used. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access a system for measuring transitions between visualizations or related data and analytics services in the cloud. For example, the system for measuring transitions between visualizations could execute on a computing system in the cloud and provide data visualization and analytics. In such a case, the system for measuring transitions between visualizations could measure transitions between visualizations for assembling sequences or sets of visualizations, and store the resultant sequences or sets at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for measuring, by an application executing on a processor, transitions between visualizations, the method comprising:
    determining a first mapping between one or more data fields represented in a first visualization and one or more visualization channels in the first visualization, wherein each of the one or more visualization channels represents a presentation characteristic in the first visualization, and wherein determining the first mapping comprises:
    identifying the one or more visualization channels in the first visualization; and
    identifying, for each of the one or more visualization channels, a corresponding data field;
    determining a second mapping between one or more data fields represented in a second visualization and one or more visualization channels in the second visualization, wherein each of the one or more visualization channels represents a presentation characteristic in the second visualization;
    generating a transition triplet comprising a continuity score, a structural discontinuity score, and a syntactic discontinuity score, wherein the transition triplet quantifies differences and similarities between the first visualization and the second visualization into numeric values based on the first mapping and the second mapping, by:
    determining a first numeric value for the continuity score based on (i) a count of data fields and a count of visualization channels common to the first and second visualizations, and (ii) a count of data fields and a count of visualization channels present in the first visualization and not present in the second visualization, wherein the first numeric value is further based on an analysis of metadata associated with the first visualization and the second visualization to determine relationships between data fields present in the first visualization and the second visualization, and wherein the first visualization and the second visualization are separate charts;
    determining a second numeric value for the structural discontinuity score based on differences in format between each visualization channel in the first and second visualizations, wherein each of the visualization channels of the first and the second visualizations comprises a respective graphical object, wherein the structural discontinuity score further reflects a count of visualization formats depicted in each visualization, and wherein the structural discontinuity score is further based on a count of data fields and a count of visualization channels present in the second visualization and not present in the first visualization; and
    determining a third numeric value for the syntactic discontinuity score based on differences between the presentation characteristics represented in the first and second visualizations, wherein a first difference between the presentation characteristics comprises a change in visualization color of one or more visualization channels from the first visualization to the second visualization, and wherein a second difference between the presentation characteristics comprises a change related to a filter from the first visualization to the second visualization; and
    outputting, by the application executing on the processor, the transition triplet for display.

2. The method of claim 1, wherein the mappings associate a format of the respective visualization to the corresponding data field, wherein the mappings associate an axis in each visualization to the corresponding data field.

3. The method of claim 1, wherein the structural discontinuity score further reflects data fields that are different between the first and second visualizations.

4. The method of claim 1, wherein the structural discontinuity score further reflects: (i) a first data field not present in the first visualization that has been added to the second visualization, and (ii) a second data field present in the first visualization that has been removed from the second visualization.

5. The method of claim 1, wherein the syntactic discontinuity score is based on the presentation characteristics of the first visualization and the presentation characteristics of the second visualization comprising: (i) a visualization size, (ii) a visualization type, (iii) whether the respective data fields have been binned, (iv) whether the respective data fields have been filtered, (v) whether the respective data fields have been disaggregated, and (vi) a number of switches for each visualization.

6. A system for measuring transitions between visualizations, the system comprising:
    one or more computer processors;
    a memory containing a program which when executed by the one or more computer processors performs an operation, the operation comprising:
    determining a first mapping between one or more data fields represented in a first visualization and one or more visualization channels in the first visualization, wherein each of the one or more visualization channels represents a presentation characteristic in the first visualization, and wherein determining the first mapping comprises:
    identifying the one or more visualization channels in the first visualization; and
    identifying, for each of the one or more visualization channels, a corresponding data field;
    determining a second mapping between one or more data fields represented in a second visualization and one or more visualization channels in the second visualization, wherein each of the one or more visualization channels represents a presentation characteristic in the second visualization;
    generating a transition triplet comprising a continuity score, a structural discontinuity score, and a syntactic discontinuity score, wherein the transition triplet quantifies differences and similarities between the first visualization and the second visualization into numeric values based on the first mapping and the second mapping, by:

determining a first numeric value for the continuity score based on (i) a count of data fields and a count of visualization channels common to the first and second visualizations, and (ii) a count of data fields and a count of visualization channels present in the first visualization and not present in the second visualization, wherein the first numeric value is further based on an analysis of metadata associated with the first visualization and the second visualization to determine relationships between data fields present in the first visualization and the second visualization, and wherein the first visualization and the second visualization are separate charts;

determining a second numeric value for the structural discontinuity score based on differences in format between each visualization channel in the first and second visualizations, wherein each of the visualization channels of the first and the second visualizations comprises a respective graphical object, wherein the structural discontinuity score further reflects a count of visualization formats depicted in each visualization, and wherein the structural discontinuity score is further based on a count of data fields and a count of visualization channels present in the second visualization and not present in the first visualization; and determining a third numeric value for the syntactic discontinuity score based on differences between the presentation characteristics represented in the first and second visualizations, wherein a first difference between the presentation characteristics comprises a change in visualization color of one or more visualization channels from the first visualization to the second visualization, and wherein a second difference between the presentation characteristics comprises a change related to a filter from the first visualization to the second visualization; and outputting the transition triplet for display.

7. The system of claim 6, wherein the mappings associate a format of the respective visualization to the corresponding data field, wherein the mappings associate an axis in each visualization to the corresponding data field.

8. The system of claim 6, wherein the structural discontinuity score further reflects data fields that are different between the first and second visualizations.

9. The system of claim 6, wherein the structural discontinuity score further reflects: (i) a first data field not present in the first visualization that has been added to the second visualization, and (ii) a second data field present in the first visualization that has been removed from the second visualization.

10. The system of claim 6, wherein the syntactic discontinuity score is based on the presentation characteristics of the first visualization and the presentation characteristics of the second visualization comprising: (i) a visualization size, (ii) a visualization type, (iii) whether the respective data fields have been binned, (iv) whether the respective data fields have been filtered, (v) whether the respective data fields have been disaggregated, and (vi) a number of switches for each visualization.

11. A computer program product comprising:
a non-transitory computer readable storage medium having computer-readable program code embodied therewith, the computer-readable program code executable to perform an operation for measuring transitions between visualizations, the operation comprising:

determining a first mapping between one or more data fields represented in a first visualization and one or more visualization channels in the first visualization, wherein each of the one or more visualization channels represents a presentation characteristic in the first visualization, and wherein determining the first mapping comprises:
identifying the one or more visualization channels in the first visualization; and
identifying, for each of the one or more visualization channels, a corresponding data field;

determining a second mapping between one or more data fields represented in a second visualization and one or more visualization channels in the second visualization, wherein each of the one or more visualization channels represents a presentation characteristic in the second visualization;

generating a transition triplet comprising a continuity score, a structural discontinuity score, and a syntactic discontinuity score, wherein the transition triplet quantifies differences and similarities between the first visualization and the second visualization into numeric values based on the first mapping and the second mapping, by:
determining a first numeric value for the continuity score based on (i) a count of data fields and a count of visualization channels common to the first and second visualizations, and (ii) a count of data fields and a count of visualization channels present in the first visualization and not present in the second visualization, wherein the first numeric value is further based on an analysis of metadata associated with the first visualization and the second visualization to determine relationships between data fields present in the first visualization and the second visualization, and wherein the first visualization and the second visualization are separate charts;

determining a second numeric value for the structural discontinuity score based on differences in format between each visualization channel in the first and second visualizations, wherein each of the visualization channels of the first and the second visualizations comprises a respective graphical object, wherein the structural discontinuity score further reflects a count of visualization formats depicted in each visualization, and wherein the structural discontinuity score is further based on a count of data fields and a count of visualization channels present in the second visualization and not present in the first visualization; and determining a third numeric value for the syntactic discontinuity score based on differences between the presentation characteristics represented in the first and second visualizations, wherein a first difference between the presentation characteristics comprises a change in visualization color of one or more visualization channels from the first visualization to the second visualization, and wherein a second difference between the presentation characteristics comprises a change related to a filter from the first visualization to the second visualization; and outputting the transition triplet for display.

12. The computer program product of claim 11, wherein the mappings associate a format of the respective visualization to the corresponding data field, wherein the mappings associate an axis in each visualization to the corresponding data field.

13. The computer program product of claim 11, wherein the structural discontinuity score further reflects data fields that are different between the first and second visualizations.

14. The computer program product of claim 11, wherein the syntactic discontinuity score further reflects: (i) a first data field not present in the first visualization that has been added to the second visualization, and (ii) a second data field present in the first visualization that has been removed from the second visualization, wherein the syntactic discontinuity score is based on the presentation characteristics of the first visualization and the presentation characteristics of the second visualization comprising: (i) a visualization size, (]ii) a visualization type, (iii) whether the respective data fields have been binned, (iv) whether the respective data fields have been filtered, (v) whether the respective data fields have been disaggregated, and (vi) a number of switches for each visualization.

* * * * *